(No Model.) 2 Sheets—Sheet 1.
L. M. CLEMENT & G. C. WATRISS.
OPERATING CABLE RAILWAYS AT SWITCHES.
No. 379,306. Patented Mar. 13, 1888.
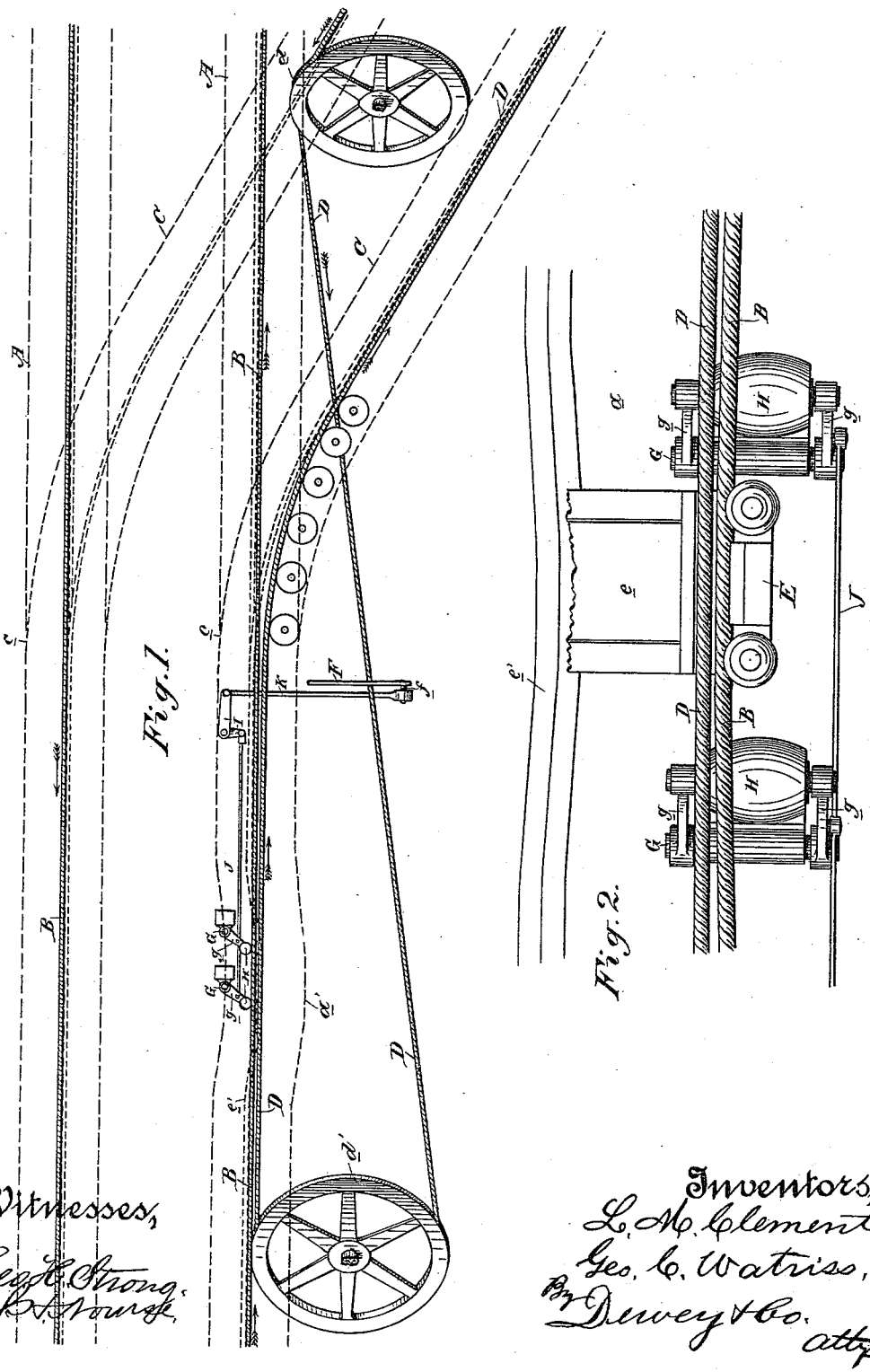

(No Model.) 2 Sheets—Sheet 2.

L. M. CLEMENT & G. C. WATRISS.
OPERATING CABLE RAILWAYS AT SWITCHES.

No. 379,306. Patented Mar. 13, 1888.

Witnesses,
Geo. H. Strong.

Inventors,
L. M. Clement,
Geo. C. Watriss,
By Dewey & Co.
atty

UNITED STATES PATENT OFFICE.

LEWIS METZLER CLEMENT, OF OAKLAND, AND GEORGE C. WATRISS, OF SAN FRANCISCO, ASSIGNORS TO HENRY ROOT, OF SAN FRANCISCO, CALIFORNIA.

OPERATING CABLE RAILWAYS AT SWITCHES.

SPECIFICATION forming part of Letters Patent No. 379,306, dated March 13, 1888.

Application filed August 29, 1887. Serial No. 248,227. (No model.)

*To all whom it may concern:*

Be it known that we, LEWIS METZLER CLEMENT, of Oakland, Alameda county, State of California, and GEORGE C. WATRISS, of the city and county of San Francisco, State of California, have invented an Improvement in Operating Cable Railways at Switches; and we hereby declare the following to be a full, clear, and exact description of the same.

Our invention relates to the class of cable railways, and especially to those which have more than one cable and operate as a continuous line.

Our invention consists in a mode or method of operation at switches where it is necessary to let go one cable and connect with the other.

Our mode or method involves the employment of a main cable and a branch cable traveling in the same direction and in the same tube for a given distance, the moving of the gripping device at some point in this distance over toward the plane of the line of travel of the branch cable, whereby said cable may spring into the jaws of the grip when said jaws are freed of the main cable, and the positive forcing of the main cable from between the jaws of the grip, whereby it is allowed to return to its normal position and the branch cable allowed to spring into the jaws so vacated. The constructions we adopt for effecting this operation will be fully explained hereinafter, but may be briefly said to consist of a curve in the track to throw the car with its grip over to the proper position and a fixed machine in the roadway at this point for forcing the main cable from the grip.

The object of our invention may be broadly stated to be the releasing of one cable and connecting with the other while the car is at a standstill. The advantage of this result we shall explain fully in the course of this specification.

Figure 3:
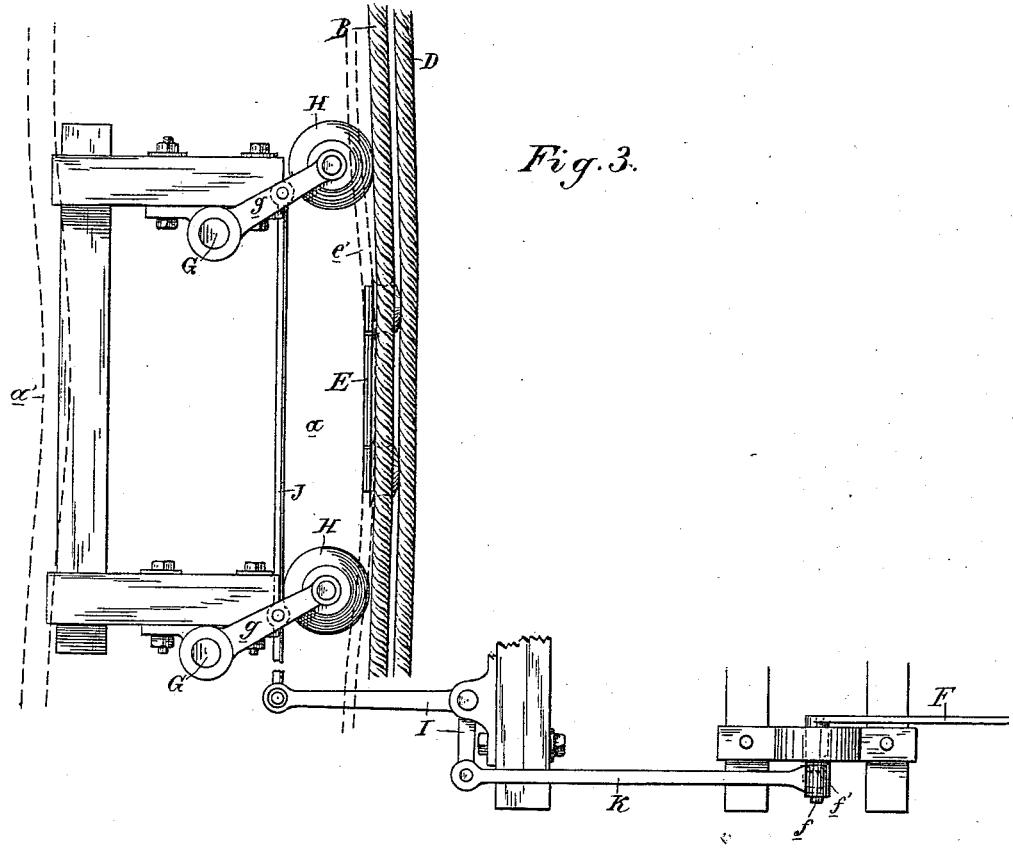
Figure 4:
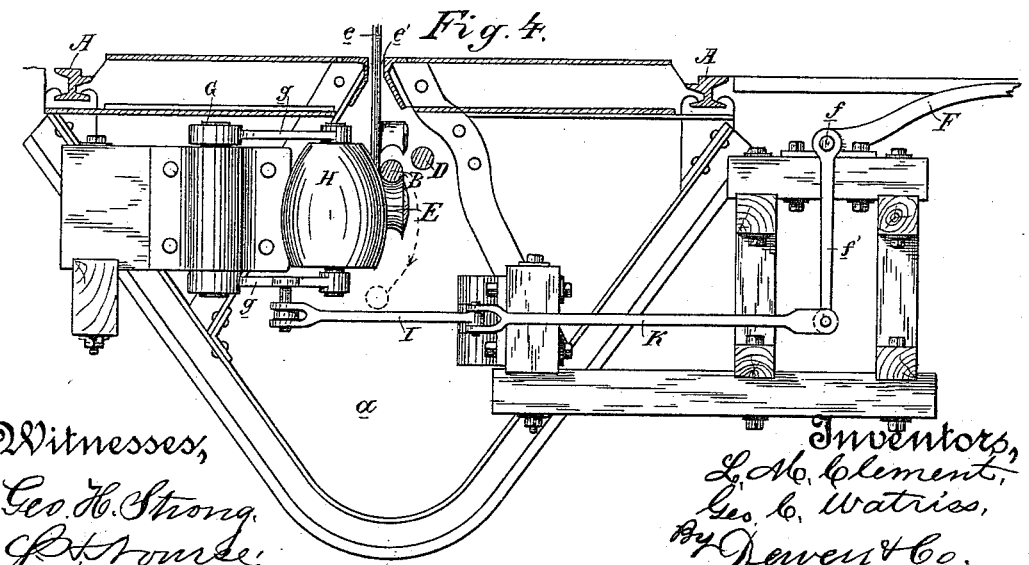

Referring to the accompanying drawings for a more complete explanation, Figure 1 is a plan showing the course of the cables, the tracks being in dotted lines. Fig. 2 is a side elevation of the grip, showing the main cable about to be forced from between its jaws and the branch cable ready to enter. Fig. 3 is a plan view of same, showing the curve $a'$ and the mechanism for operating the forcing-drums H. Fig. 4 is a cross-section of the main tube $a$.

A is the main line, in the tube $a$ of which the main cable B runs in the uptrack in the direction indicated by the arrow.

C is the branch track, leaving the main line at the point $c$.

D is the branch cable. We have here shown it as leaving the downtrack of the branch line at the point $d$, thence proceeding in the direction of the arrow in a separate tube of its own under and crossing the uptrack C of the branch line and down beside the main track A for a sufficient distance. It then enters the main tube $a$, and, turning back over a sheave, $d'$, is carried back in the main tube, running parallel with the main cable, as shown by the arrow, to the point $e$ of the separation of the up-branch track from the main track, where it diverges into the tube of the uptrack of the branch line, being guided by suitable pulleys. It will thus be seen that for a certain distance— namely, between the point at which the branch cable enters the main tube to the switch-off of the branch tube—the two cables run in the same tube and in the same direction. They are not, however, in the same horizontal plane. The normal plane of the main cable is below that of the branch cable, the latter of which is about on a level with the jaws of the gripping device, for the purpose presently to be described.

E is the lower portion of the grip, the shank $e$ of which passes through the slot $e'$ in the roadway.

It is deemed sufficient, without illustrating the truck, dummy, or car which carries the grip, to say that the truck or other grip-carrying vehicle is connected with and propelled by the traveling cable by means of the grip, and therefore what we have shown of the grip is enough to define the position and operation of the car and to enable us to refer to it as a matter well known.

The main cable is caught and held by the grip, the jaws of which are higher than the normal plane in which the main cable runs, so that said cable is elevated where engaged by the grip, inclining on each side down to its supporting-pulleys, and when fully released from the grip it drops wholly thereon, and has to be picked up again when needed. Now, if we suppose a car moving on the uptrack of the main line toward the switch, we see that when it reaches the point where the branch cable enters the main tube, and remembering that the branch cable is traveling in a higher plane and about opposite to the jaws of the grip, the two cables where the grip is are in about the same horizontal plane and moving in the same direction. Now, our object is to stop the car at any point in the distance in which the two cables thus travel together, release and drop the main cable to its place in a lower plane, and receive the branch cable between the jaws of the grip, all this taking place while the car is at a standstill.

As the essence or principle of our invention lies in this mode or method of operation, it may be well at this point to show its advantages by contrasting it with the methods now in use. The customary way of switching from the main to the branch cables, and vice versa, is to release the first cable and depend upon the momentum of the car to carry the grip to a point where the second cable may be picked up. On a downgrade this plan is not open to serious objections, for it is reasonably certain, and the momentum may be depended upon; but on an upgrade there is no such certainty, even under the most favorable circumstances, and in most cases the plan is entirely unfeasible, as no momentum can be maintained. The avoiding of an upgrade and the artificial formation of a downgrade by warping the street (which has been tried) to meet this difficulty is not practical, being in some cases impossible and in others undesirable; but even where all the conditions are favorable to the momentum idea the plan is inherently defective, because of the skill its successful operation demands of the gripman. He is required to judge with some accuracy the point at which he is to release the cable, and this point must be determined by the degree of momentum necessary to carry his car the required distance. If his judgment fails, or if, for any reason, he has to stop the car between the point at which he releases the cable and the point at which the other cable can be picked up, he must resort to extraneous force to reach the latter point. Again, if he fails to release the first cable soon enough, his car will be switched while he still has hold, so that the cable will be drawn over into the other line, thereby producing serious injury. From the suggestion of these difficulties it will readily be seen that our invention—namely, our mode or method of operation—completely obviates them all.

We can accomplish our object on any kind of a grade. We need not warp the surface of the street, nor do we require particular skill on the part of the gripman, for the reason that all he is charged with is to stop his car at the proper place, and then release the cable from the binding effect of the jaws of the grip. The remainder of the operation does not depend upon him, and when he closes his grip again he will find himself connected with the other cable.

We will now proceed to describe certain constructions and devices for carrying our mode or method into effect.

In the first place we curve sidewise the main track at some point in the length between where the branch cable enters the main tube and where it diverges into its own tube. This we have shown at $a'$, and it is upon this curved part that the gripman will bring his car to a stop. The object of this is to throw the face of the grip-jaws over against the branch cable, whereby said cable is pressed slightly to one side, thus creating a side draft or departure from a straight draft, back to which when free it will naturally spring. Therefore, after the main cable has been released, forced out of the grip, and dropped to its normal plane, the branch cable, by its tendency to return to a straight draft, will enter the open jaws of the grip and take the place vacated by the main cable, so that by closing the grip the car is connected with the branch cable and may proceed. We come now to the means for forcing out of the jaws of the grip the main cable, so that its place may be taken by the branch cable. We do not wish to confine ourselves to any particular mechanism. There may be several means for accomplishing the result, and when the result is clearly seen the provision of means for effecting it is of secondary importance and may fall within the knowledge of many men. We do not therefore describe the means we propose to adopt as of prime importance in themselves, but simply consider them as one form adapted for the purpose, and which may stand for many equivalent mechanisms.

Beside the main track and opposite the curved portion $a'$ is a hand-lever, F, which is secured to and turns a shaft, $f$, from which extends downwardly into a suitable casing in the street a crank-arm, $f'$. Within the main tube $a$ and on the opposite side are vertically-arranged shafts G, which have crank-arms $g$, between the ends of which are mounted the freely-rotating anti-friction drums H, the sweep of which, due to the axial movement of the shafts G, will bring them into contact with the main cable, both in front of and behind the grip, and will force said cable over and out of the jaws of the grip, whereupon said cable will drop down to its normal plane, leaving the grip free to receive the branch cable, which, as before stated, springs into the jaws under the force of the straight draft. The necessary sweep is transmitted to the drums H by means of the bell-crank lever I, the link J connecting one of its arms with the crank-arms $g$ of the shafts G, and the link K connecting its other arm with the crank-arm $f'$ of shaft $f$, which is operated by the lever F in the street. After the forcing-drums H have removed the main cable from the grip, they are moved back again by lowering lever F, so that they are not in the way of the grip. The drums being mounted so as to freely rotate on their own axes, there is no friction caused by their contact with the rope; nor is there any friction due to the contact of the two cables as they momentarily grind together, for they travel in the same direction. There is also no injury to fear from the contact and pressure or strain of the branch cable on the face of the grip-jaws when forced over, for the intention is to operate the forcing-drums H immediately, so that but a very short period elapses before the main cable in moving out is pressing the branch cable farther over and relieving the grip of strain.

We may, if found desirable, curve the track at $a'$ down as well as sidewise. This we have shown in Fig. 2. Its object is to lower the grip slightly, and thereby render it easier to force the main cable from between the jaws by lowering said cable nearer to its normal plane.

Having thus described our invention, what we claim as new, and desire to secure by Letters Patent, is—

1. In a cable railway, the mode or method of operating at switches which consists in running the main and branch cables for a given distance in the same tube and in the same direction, moving the grip over into the line of travel of and into contact with the free cable, whereby said cable is forced from a straight draft, forcing the engaged cable from between and free of the grip-jaws, and receiving the free cable between said jaws as it springs back to the straight draft, substantially as described.

2. In a cable railway, the mode or method of operating at switches which consists in running the main and branch cables for a given distance in the same tube and in the same direction, but in different horizontal planes, moving the grip while still engaging one cable over into the line of travel of and in contact with the other or free cable, whereby both said cables are forced from the straight draft, forcing the first cable from between and free of the grip-jaws, whereby it drops down and back to its normal plane, and receiving the free cable between said jaws as it springs back to the straight draft, substantially as described.

3. In a cable railway, the mode or method of operating at switches which consists in running the main and branch cables for a given distance in the same tube and in the same direction, deflecting the grip-carrying car from its line of travel over toward the plane of the line of travel of the branch cable at some point within said distance, whereby the grip is brought into contact with and forces the branch cable from a straight draft, and then forcing the main cable from between and free of the jaws of the grip, whereby said jaws are vacant to receive the branch cable as it springs back to a straight draft, substantially as described.

4. In a cable railway, the mode or method of operating at switches which consists in running the main and branch cables for a given distance in the same tube and in the same direction, but in different horizontal planes, deflecting the grip-carrying car to one side at some point within said distance, whereby the main cable is deflected by the grip, and said grip is brought over into contact with and forces the branch cable from a straight draft, and then forcing the main cable out of the jaws of the grip, whereby it is permitted to return to its normal plane and the branch cable allowed to spring into the jaws so vacated, substantially as described.

In witness whereof we have hereunto set our hands.

LEWIS METZLER CLEMENT.
GEO. C. WATRISS.

Witnesses:
LEWIS TASHEIRA,
JAS. J. FAGAN.